I. H. DAVIS.
SHOCK OPERATED SPEED CONTROLLING APPARATUS FOR SELF PROPELLED VEHICLES.
APPLICATION FILED MAY 15, 1914.
1,155,471. Patented Oct. 5, 1915.
2 SHEETS—SHEET 1.
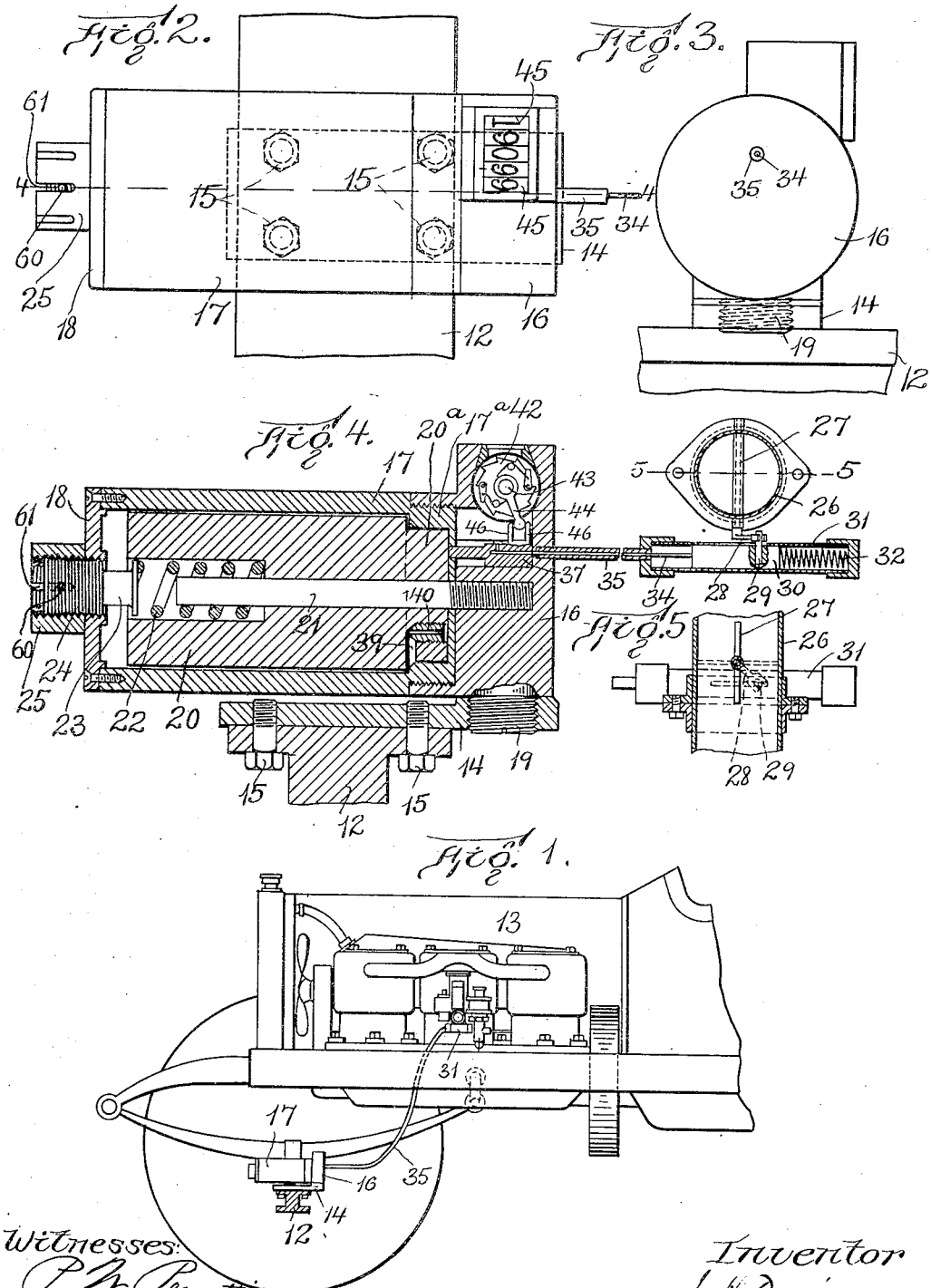

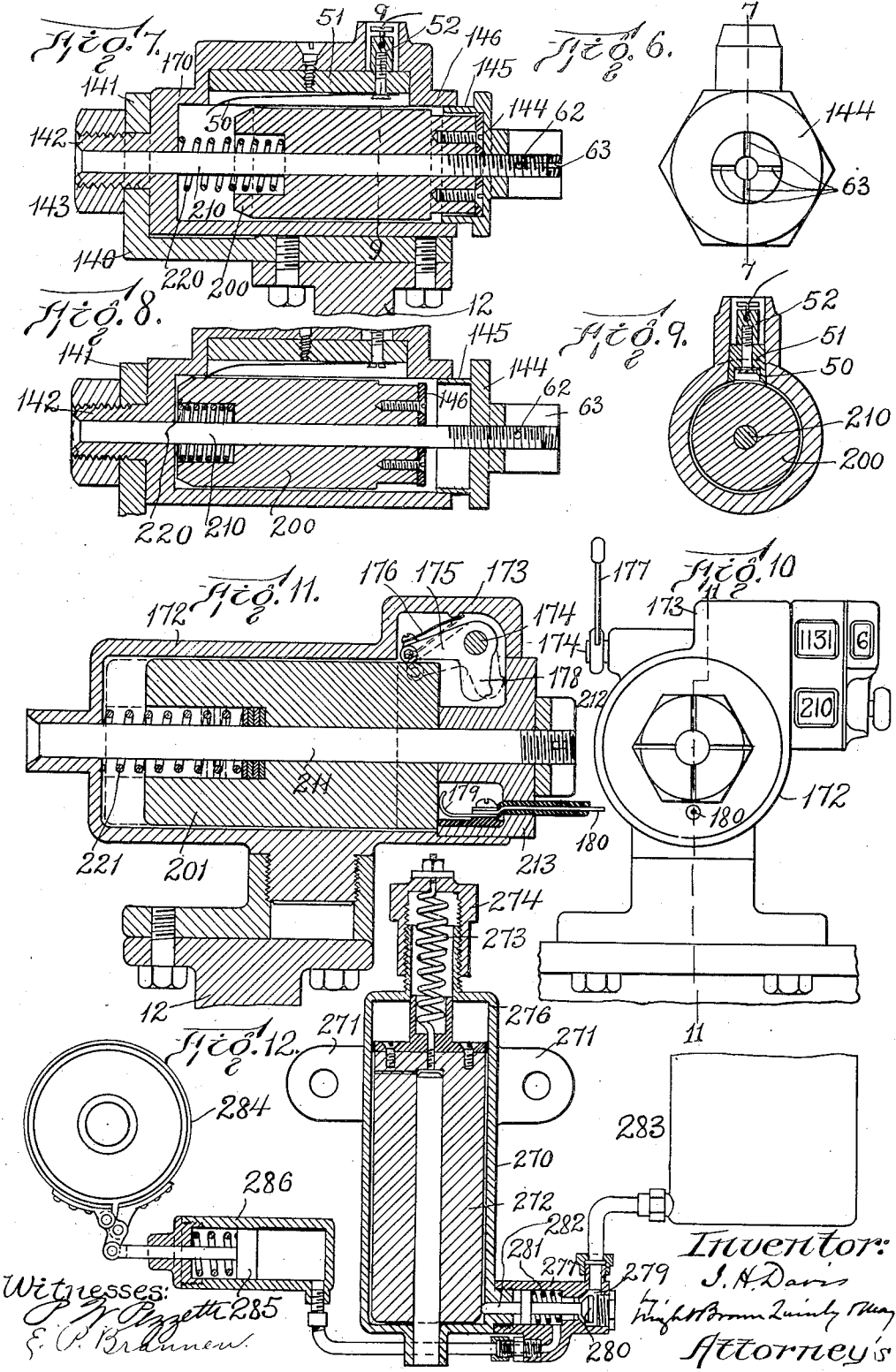

UNITED STATES PATENT OFFICE.

ISAAC H. DAVIS, OF NEWTONVILLE, MASSACHUSETTS, ASSIGNOR, BY DIRECT AND MESNE ASSIGNMENTS, OF ONE-HALF TO HENRY H. WESTINGHOUSE, OF NEW YORK, N. Y., AND ONE-HALF TO MARY C. DAVIS, OF BOSTON, MASSACHUSETTS.

SHOCK-OPERATED SPEED-CONTROLLING APPARATUS FOR SELF-PROPELLED VEHICLES.

1,155,471.  Specification of Letters Patent.  Patented Oct. 5, 1915.

Application filed May 15, 1914. Serial No. 838,767.

*To all whom it may concern:*

Be it known that I, ISAAC H. DAVIS, a citizen of the United States, and resident of Newtonville, in the county of Middlesex and State of Massachusetts, have invented certain new and useful Improvements in Shock-Operated Speed-Controlling Apparatus for Self-Propelled Vehicles, of which the following is a specification.

This invention has for its object to provide automatic means whereby injurious shocks and vibrations to which a self-propelled vehicle, such as an automobile or a motor truck, is subjected, are caused to temporarily check the speed of the vehicle, the injurious shocks and vibrations referred to being those due to roughness of the road, excessive speed at curves, to an excessively abrupt application or letting in of the clutch, to excessively quick changes of speed through the transmission gearing, and to an excessively abrupt application of the brake in stopping.

The invention when applied to an automobile or a motor truck (each of these being included hereinafter in the term motor vehicle) is embodied in an attachment which is caused by the said shocks and vibrations to temporarily decrease the speed of the vehicle. Said attachment includes an inertia weight so mounted on the vehicle as to be moved or projected from a normal, inoperative position by its own inertia when the vehicle is subjected to an injurious shock or vibration, and speed-controlling means operated by said movement of the weight to reduce the speed of the vehicle.

The apparatus of my invention provides a new means of control of the amount of energy expended in propelling the vehicle, and, while inoperative by unimportant or negligible shocks or vibrations, becomes operative when the shocks so increase in amplitude and strength that they are liable to be destructive, and by its operation protects the vehicle against injury.

Of the accompanying drawings forming a part of this specification, Figure 1 represents a side view of a portion of a motor vehicle equipped with a shock-operated speed-controlling apparatus embodying my invention, the front axle of the vehicle being shown in section; Fig. 2 represents a plan view of a portion of the apparatus and of a part of the front axle; Fig. 3 represents an end view of the portion shown by Fig. 2; Fig. 4 represents a section on line 4—4 of Fig. 2, and a sectional view showing a throttle valve and instrumentalities coöperating with the weight in opening and closing the valve; Fig. 5 represents a section on line 5—5 of Fig. 4; Fig. 6 represents an end view of the weight-containing portion of a different form of apparatus embodying the invention, said portion being removed from its holder; Fig. 7 represents a section on line 7—7 of Fig. 6, showing also the holder of said weight-containing portion and a part of the front axle, the inertia weight being in its normal position; Fig. 8. represents a view similar to a portion of Fig. 7, showing the weight displaced or projected by inertia from its normal position; Fig. 9 represents a section on line 9—9 of Fig. 7; Fig. 10 represents an end view of a portion of a differently organized apparatus embodying the invention; Fig. 11 represents a section on line 11—11 of Fig. 10; Fig. 12 represents somewhat diagrammatically a sectional view of a portion of an apparatus including an inertia weight and its holder, and an air brake adapted to be set by the operation of the apparatus.

The same reference characters indicate the same or similar parts in all the views.

I will first describe the embodiment of the invention shown in Figs. 1 to 5 inclusive. 12 represents the front axle of an automobile the engine of which is shown at 13. 14 represents an arm or bracket rigidly attached by screws 15 to the axle 12. A casing composed of a head 16, a horizontal tubular body 17, and a cap 18, is rigidly attached to the arm 14 preferably by a threaded stud 19 in the head, screwed into a tapped orifice in the arm. 20 represents an inertia weight within the tubular body 17, said weight being centrally bored to receive a horizontal guide pin 21 attached to the head 16 and having a free sliding fit on said pin, the greater part of the external surface of the weight being supported out of contact with the interior of the casing to reduce to the minimum the frictional resistance to endwise movements of the weight. The inner end portion 20$^a$ of the weight has a cylindrical surface having a somewhat close sliding fit in the corresponding portion 17ª of the body 17, said portions 20ª and 17ª forming a dash pot for a purpose presently described. The weight 20 is normally held yieldingly in the position shown by Fig. 4, by a spring 22 interposed between a seat on the weight and an adjustable abutment 23 on a threaded plug 24 which is screwed into the cap 18, and is engaged by a lock nut 25 adapted to secure the abutment 23 at different adjustments so that the tension of the spring may be suitably adjusted. 26 represents a conduit which supplies the engine cylinders with the usual working agent, such as a mixture of hydrocarbon vapor and air. In said conduit is a throttle valve 27, which is independent of the usual manually controlled throttle valve (not shown). The spindle of the valve 27 has a crank arm 28, the pin 29 of which enters a slide 30 in a tubular guide 31. A spring 32 in said guide normally holds the slide 30 in the position shown by Fig. 4, and holds the throttle valve 27 normally open, as shown by Fig. 5. 34 represents a member for transmitting motion from the weight 20 to the valve 27, to close the latter, the term "close" as here used meaning that the valve is moved toward its closed position and not necessarily completely closed. Said member as here shown is an elongated flexible wire extending from the casing which holds the weight 20, to the guide 31, and inclosed in a flexible sheath 35, the wire member 34 and its sheath constituting what is known as a "Bowden wire", the inner member 34 of which is movable endwise in the outer member or sheath 35. One end of the member 34 bears against the slide 30, and its other end is fastened to a terminal 37 which is fitted to slide in the casing head 16 and through an orifice in the closed end of the dash pot portion 17ª.

When the vehicle is running smoothly without being subjected to injurious shocks or vibrations resulting from either of the causes before mentioned, the weight 20 is held by the spring 22 in its normal position, and the valve 27 is held open by the wire 34, which in turn is held by the weight so that the valve closing force of the spring 32 is overcome.

When the vehicle is subjected to an injurious shock or vibration, the weight 20 is thrown forward or moved endwise to the left in Fig. 4 by its own inertia so that the spring 32 is free to close the valve, the slide 30 and wire 34 being moved endwise by the spring 32, as far as the displacement of the weight 20 will permit. The spring 22 now acts to return the weight 20 to its normal position and cause the weight to open the valve 27 through the wire 34 and the described connections, the resistance of the spring 32 being overcome by the stronger spring 22. This return movement is retarded by the dash pot formed by the parts 20ª and 17ª, said dash pot having an air outlet 39 the capacity of which may be varied by an adjustable tubular plug 40, the bore of which forms a part of said outlet.

It will now be seen that a shock or jar sufficient to displace or project the weight 20 from its normal position causes a temporary slowing down of the engine, and that the described means for adjusting the tension of the spring 22 enables the apparatus to be adjusted to respond to shocks and vibrations of different amplitude, while the adjustability of the air outlet 39 enables the period of slowing down to be varied. It should be here stated however that the weight may be locked in its displaced position so that the engine will remain slowed down until the weight is manually released as hereinafter described.

In most cases the displacement of the weight as above described is the result of carelessness on the part of the operator. To make a record of such carelessness I provide a counter 42 which may be of the well known Veeder type shown by Letters Patent No. 634,073, said counter having a rockshaft 43, an arm 44 thereon, and numbered disks 45 (Fig. 2) which are moved step by step and successively in a well known manner by movements of said rockshaft.

The rockshaft arm 44 is engaged by fingers 46 on the terminal 37, so that the movements of said terminal oscillate the rockshaft arm 43 and operate the counter.

The weight-containing casing may be readily attached to a front axle 12, without adaptation of the latter other than the formation of holes for the screws 15. The apparatus may therefore be installed on a motor vehicle by attaching the weight-containing casing to the axle and connecting the instrumentalities, such as the terminal 37 and one end of the wire 34, carried by the casing, with the other instrumentalities carried by other parts of the vehicle.

Figs. 7 to 11 show embodiments of the invention in which a movement of the weight by its own inertia may operate to reduce the speed by retarding the spark in an internal combusion engine or by cutting out electrically one or more of the sparking plugs.

Figs. 6, 7, 8 and 9 show a construction which includes a contact spring 50 attached to an insulating block 51 occupying a recess in the weight-containing casing 170, a binding post 52 attached to said block and in circuit with the spring 50. The inertia weight 200 is a conductor of electricity and when in its normal position is out of contact with the spring 50, as shown by Fig. 7. When the weight is thrown forward by inertia as shown by Fig. 8, it makes contact with the spring 50 and thus closes an electric circuit forming a part of electrically operated speed-reducing means. In this embodiment of the invention the arm 140 attached to the axle 12 has an upstanding perforated ear 141, which receives a stud 142 on the casing body 170, said stud being engaged by a nut 143. The guide rod 210 has at one end a head which is seated on the stud 142, its opposite end being threaded and engaged with an internally threaded head 144 having a flange 145. Said head and flange form the cylinder of a dash pot, the piston of which is formed by a head 146 on the weight 200. The head 144 may be adjusted on the guide rod 210 to vary the tension of the spring 220, which in this case is seated directly on the closed end of the casing body 170.

Figs. 10 and 11 show an embodiment of the invention in which the inertia weight when projected from its normal position by inertia is locked so that it cannot be returned to its normal position until it is manually released. The casing 172 has an enlargement 173 in which is journaled a rockshaft 174 having an arm 175 which is pressed inwardly by a spring 176. When the weight 210 is in its normal position the arm 175 bears on the weight, as shown by full lines in Fig. 11. When the weight is projected by inertia from its normal position, the arm 175 drops behind its inner end, as shown by dotted lines, and prevents the return of the weight to its normal position until the rockshaft 174 is turned by an external handle 177 to raise the arm 175. A stop arm 178 limits the inward movement of the arm 175. The tension of the weight-returning spring may be regulated by means of the guide rod 211, having a head at one end and screw-threaded at the other end, a nut 212 engaged with said threaded end, and a movable head 213 held by the nut 212, and forming an adjustable stop for the weight 201. As here shown, the weight 201 is normally in contact with a terminal 179 forming a part of an electric circuit which includes a wire 180 and is broken by the projection of the weight from its normal position.

Fig. 12 shows an apparatus in which the weight is adapted to be projected by inertia and to open a valve, causing the application of a brake shoe or shoes.

The casing body 270 is provided with ears 271 whereby it may be attached to a support. The weight 272 is movable vertically in the casing and is normally supported in its highest position by a spring 273 attached at one end to the weight and at the other end to an adjustable cap 274 having a screw-thread connection with a nipple in the casing, so that the tension of the spring may be varied by turning the cap. The weight is provided with a dash pot piston 276 which fits the interior of the casing 270, a weight-retarding dash pot being thus provided. The lower end of the casing 270 has an arm 277 containing an air passage which is connected with a valve chamber 279 forming a part of an air pipe line communicating with a chamber 283 in which compressed air is stored. A valve 280 controlled by a spring 281 normally closes the air passage, and has a stem 282 which projects into the casing 270. When the weight 272 is projected by inertia its advancing end strikes the stem 282 and opens the valve 280, thus liberating air from the chamber 283, and causing the application of a band brake 284, the air acting on a piston 285 connected with said shoe and movable in a cylinder 286, which communicates with the air pipe line. The weight 272 is movable vertically, but it is obvious that it may be movable in a different direction if desired.

It will now be seen that my invention virtually compels the operator of a motor vehicle to which the apparatus is applied to operate the vehicle intelligently and carefully and to practice methods which will insure the vehicle against destructive shocks and vibrations. The apparatus is so organized or may be so adjusted that it will not be affected by small shocks or vibrations, and will respond only to shocks and vibrations of sufficient amplitude to be injurious, the described adjustability of the tension of the weight-returning spring permitting the apparatus to be adjusted to such various conditions. In each embodiment of the invention, excepting that shown by Figs. 10 and 11, the displacement of the inertia weight causes a reduction of the speed for a few seconds or minutes until normal and safe running conditions obtain, when the normal speed is automatically restored.

The inertia weight may be located at any desired part on the vehicle, the forward axle being a suitable part, because the weight is enabled to respond quickly to shocks caused by obstructions and hollows encountered by the front wheels.

Means are preferably provided for sealing the weight-inclosing casing so that it cannot be opened and tampered with without detection. In the embodiment of the invention shown by Fig. 4 the stud 24 is provided with an orifice 60 and the nut 25 with a slot 61 intersecting said orifice, the orifice and slot being adapted to receive a wire which may be provided with a lead seal. In Figs. 7 and 8 I show the rod 210 provided with an orifice 62 and the head 144 provided with a slot 63 for the same purpose.

A road or highway in bad condition usually presents a long series of depressions and obstacles likely to cause a series of shocks and vibrations. My apparatus constantly requires an operator driving over a road of this character to maintain a safe speed, and, when equipped with a counter, is a constant incentive to careful driving, because reckless driving will inevitably be made known by the counter.

I am aware that it has been proposed to regulate the rate of speed of a motor vehicle and the rate of change of speed of the same by inertia-controlled means unaffected by a constant speed of the vehicle and adapted to vary the power of the vehicle-moving means. The inertia-controlled means of the prior art is not so organized that it is responsive to inequalities in or roughness of the road or track on which the vehicle travels, and is adapted only for use on a vehicle such as a street car running on rails.

My inertia weight is distinguished from the prior art by the fact that the inertia weight is movable by its own inertia in response to inequalities in or roughness of a road or highway, and is therefore adapted to automatically decrease the speed of a road vehicle such as an automobile or a motor truck, when the same is running on a rough road, so that provision is made for automatically reducing to the minimum the wear and tear of tires, springs and other parts of the vehicle.

Having described my invention, I claim:

1. An apparatus of the character stated, comprising, in combination, a road vehicle, a motor therefor, an inertia weight movable independently of the body of the vehicle and normally held yieldingly in an inoperative position on the vehicle, said weight being movable from inoperative position by its own inertia in response to shocks due to the too rapid progress over inequalities and roughness of the road, and means operated by a movement of said weight from its normal position to shut off the power to said motor.

2. An apparatus of the character stated, comprising, in combination, a road vehicle, a motor therefor, an inertia weight movable independently of the body of the vehicle and normally held yieldingly in an inoperative position on the vehicle, said weight being movable from inoperative position by its own inertia in response to shocks due to the too rapid progress over inequalities and roughness of the road and speed controlling means operated by a movement of said weight from its normal position to shut off the power to said motor, and by the return of the weight to its normal position to permit the motor to be again operated.

3. An apparatus of the character stated, comprising, in combination, a road vehicle, a motor therefor, an inertia weight movable independently of the body of the vehicle and normally held yieldingly in an inoperative position on the vehicle, said weight being movable from inoperative position by its own inertia in response to shocks due to the too rapid progress over inequalities and roughness of the road, and motor controlling means operated by a movement of said weight from its normal position to shut off the power to said motor, and by the return of the weight to its normal position to permit the motor to be again operated, and means for retarding the return movement of the weight.

4. An apparatus of the character stated, comprising, in combination, a road vehicle, an inertia weight normally held yieldingly in an inoperative position on the vehicle, and movable therefrom by its own inertia in response to inequalities in or roughness of the road, speed-controlling means operated by a movement of the vehicle to reduce the speed, a recording device and connections between said weight and recording device for operating the latter and recording movements of the weight.

5. An apparatus of the character stated, comprising in combination, a road vehicle, a casing having means for attachment to the vehicle, an inertia weight movable in said casing, means for yieldingly holding the weight in a normal position from which it is movable by inertia in response to inequalities in or roughness of the road, and speed-controlling instrumentalities carried by the casing and operated by a movement of the weight from its normal position to coöperate with other instrumentalities in reducing the speed of the vehicle.

6. An apparatus of the character stated, comprising in combination, a road vehicle, a casing having means for attachment to the vehicle, an inertia weight movable in said casing, means for yieldingly holding the weight in a normal position from which it is movable by inertia in response to inequalities in or roughness of the road, speed-controlling instrumentalities carried by the casing and operated by a movement of the weight from its normal position to coöperate with other instrumentalities in reducing the speed of the vehicle, and by the return of the weight to its normal position in restoring the speed, the casing and weight being provided with means for retarding the return movement of the weight.

7. An apparatus of the character stated, comprising in combination, a road vehicle, a casing having means for attachment to the vehicle, an inertia weight movable in said casing, means for yieldingly holding the weight in a normal position from which it is movable by inertia in response to inequalities in or roughness of the road, speed-controlling instrumentalities carried by the casing and operated by a movement of the weight from its normal position to coöperate with other instrumentalities in reducing the speed of the vehicle, and by the return of the weight to its normal position in restoring the speed, the casing and weight being provided with coöperating dash pot members adapted to retard the return movement of the weight.

8. An apparatus of the character stated, comprising in combination, a road vehicle, a casing having means for attachment to the vehicle, an inertia weight adapted to reciprocate in said casing, a spring which normally holds the weight yieldingly at one end of its path and permits movement of the weight by inertia in response to unequalities in or roughness of the road from its normal position, and speed-controlling instrumentalities carried by the casing and adapted to be operated by a movement of the weight from its normal position to coöperate with other instrumentalities in reducing the speed of the vehicle.

9. An apparatus of the character stated, comprising a casing having means for attachment to a vehicle, an inertia weight adapted to reciprocate in said casing, a spring which normally holds the weight yieldingly at one end of its path and permits movement of the weight by inertia from its normal position, and speed-controlling instrumentalities carried by the casing and adapted to be operated by a movement of the weight from its normal position to coöperate with other instrumentalities in reducing the speed of the vehicle, and by the return of the weight to its normal position in restoring the speed, the casing being provided with a dash pot cylinder and the weight with a dash pot portion which coöperates with the cylinder in retarding the return movement of the weight.

10. An apparatus of the character stated, comprising in combination, a road vehicle, a casing having means for attachment to the vehicle, an inertia weight movable in said casing, means for yieldingly holding the weight in a normal position from which it is movable by inertia in response to unequalities in or roughness of the road, speed-controlling instrumentalities carried by the casing and adapted to be operated by a movement of the weight from its normal position to coöperate with other instrumentalities in reducing the speed of the vehicle, a counter on the casing, and connections between the weight and counter whereby the latter is operated to record movements of the weight.

11. An apparatus of the character stated, comprising a fixed casing having means for attachment to a vehicle and a fixed central guide rod, an inertia weight loosely fitting the casing and centrally bored to receive said rod, the weight being adapted to reciprocate on the rod, a spring which normally holds the weight at one end of its path and permits movement of the weight by inertia from its normal position, and speed-controlling instrumentalities carried by the casing and adapted to be operated by a movement of the weight to its normal position to coöperate with other instrumentalities in reducing the speed of the vehicle.

12. An apparatus of the character stated, comprising a fixed casing having means for attachment to a vehicle, an inertia weight adapted to reciprocate in the casing, a spring which normally holds the weight at one end of its path and permits movement of the weight by inertia from its normal position, means for adjusting the tension of said spring to vary its resistance to the inertia movement of the weight, and speed-controlling instrumentalities carried by the casing and adapted to be operated by a movement of the weight from its normal position to coöperate with other instrumentalities in reducing the speed of the vehicle.

13. An apparatus of the character stated, comprising, in combination, a road vehicle, an inertia weight normally held yieldingly in an inoperative position on the vehicle and movable therefrom by its own inertia in response to inequalities in or roughness of the road, a throttle valve controlling the admission of a working agent to the engine of the vehicle, and instrumentalities coöperating with said weight to close the valve when the weight is moved from its normal position.

14. An apparatus of the character stated, comprising, in combination, a road vehicle, an inertia weight normally held yieldingly in an inoperative position on the vehicle and movable therefrom by its own inertia in response to inequalities in or roughness of the road, a throttle valve controlling the admission of a working agent to the engine of the vehicle, and instrumentalities coöperating with said weight to close the valve when the weight is moved from its normal position, and to open the valve when the weight is returned to its normal position.

15. An apparatus of the character stated, comprising, in combination, a road vehicle, an inertia weight normally held yieldingly in an inoperative position on the vehicle and movable therefrom by its own inertia in response to inequalities in or roughness of the road, a throttle valve controlling the admission of a working agent to the engine of the vehicle, yielding means normally holding the valve open, and valve opening means actuated by the return of the weight to its normal position.

16. An apparatus of the character stated, comprising, in combination, an inertia weight normally held yieldingly in an inoperative position and movable therefrom by its own inertia, a throttle valve controlling the admission of a working agent to an engine, a spring-pressed slide and a crank arm connecting the slide with the valve whereby the valve is normally held open, and a push member interposed between the said slide and the weight, whereby the valve is closed by a movement of the weight to its normal position.

17. An apparatus of the character stated, comprising, in combination, a casing attached to a part of a self-propelled vehicle, an inertia weight movable in said casing, means for yieldingly holding the weight in a normal position from which it is movable by inertia, a throttle valve controlling the admission of a working agent to the engine of said vehicle, a spring, and means coöperating therewith to hold the valve yieldingly open, and a flexible push wire having a terminal slidable in the casing and pressed yieldingly against the weight, said push wire being movable by the weight to close the valve when the weight is returned to its normal position.

18. An apparatus of the character stated, comprising, in combination, a casing attached to a part of a self-propelled vehicle, and having a counter which includes a rockshaft and an arm thereon, an inertia weight movable in said casing, means for yieldingly holding the weight in a normal position from which it is movable by inertia, a throttle valve controlling the admission of a working agent to the engine of said vehicle, a spring, and means coöperating therewith to hold the valve yieldingly open, and a flexible push wire having a terminal slidable in the casing and movable with the weight to close the valve when the weight moves to its normal position, said terminal being engaged with the counter arm to operate the counter.

19. An apparatus of the character stated, comprising a fixed casing, a weight movable therein by its own inertia and normally held yieldingly at one end of its movement, instrumentalities carried by the casing and adapted to coöperate with other instrumentalities external thereto in reducing speed when the weight is moved by inertia, and means for sealing the casing.

20. An apparatus of the character stated comprising, in combination, an inerta weight normally held yieldingly in an inoperative position and movable therefrom by its own inertia, speed controlling means operated by a movement of said weight from its normal position to reduce the speed, and by the return of the weight to its normal position to restore the speed, means for retarding the return movement of the weight, and means for varying the retardation of said return movement.

In testimony whereof I have affixed my signature, in presence of two witnesses.

ISAAC H. DAVIS.

Witnesses:
C. F. Brown,
P. W. Pezzetti.